(12) United States Patent
Jeffrey

(10) Patent No.: US 7,665,804 B1
(45) Date of Patent: Feb. 23, 2010

(54) SEAT HEADREST COVER FOR USE AS A DISPLAY DEVICE

(76) Inventor: Vernon Michael Jeffrey, Wr. Plantz Rd. #20, Ebenezer Estate, St. Maarten (AN)

( * ) Notice: Subject to any disclaimer, the term of this patent is extended or adjusted under 35 U.S.C. 154(b) by 0 days.

(21) Appl. No.: 12/313,337

(22) Filed: Nov. 19, 2008

Related U.S. Application Data

(63) Continuation-in-part of application No. 11/052,638, filed on Feb. 7, 2005, now abandoned, and a continuation-in-part of application No. 11/999,767, filed on Dec. 7, 2007.

(51) Int. Cl.
*A47C 7/38* (2006.01)
*A47C 31/11* (2006.01)

(52) U.S. Cl. ............... 297/220; 297/219.1; 297/224

(58) Field of Classification Search ......... 297/220–229, 297/219.1, 228.1
See application file for complete search history.

(56) References Cited

U.S. PATENT DOCUMENTS

| | | | | |
|---|---|---|---|---|
| 2,227,180 A * | 12/1940 | Falk | ............................ | 297/223 |
| 2,793,683 A * | 5/1957 | Trubitt | ....................... | 297/224 |
| 4,056,281 A | 11/1977 | Byrnes | ........................ | 297/220 |
| 4,099,772 A | 7/1978 | Barecki | ....................... | 297/220 |
| 4,206,945 A | 6/1980 | Kifferstein | ................... | 297/220 |
| 4,253,701 A * | 3/1981 | Kifferstein | ................... | 297/220 |
| 4,627,587 A | 12/1986 | McCutchan | ................. | 244/122 |
| 4,813,740 A * | 3/1989 | Yon et al. | ................. | 297/228.1 |
| 4,824,168 A * | 4/1989 | Makoski | ...................... | 297/229 |
| 5,441,789 A * | 8/1995 | Walker | ......................... | 428/78 |
| 5,655,813 A * | 8/1997 | Kirkpatrick | ................. | 297/220 |
| 5,802,643 A * | 9/1998 | Sloot | ............................. | 5/656 |
| 5,975,638 A * | 11/1999 | Schreiner | .................... | 297/398 |
| 6,761,404 B2 | 7/2004 | Paker et al. | ................. | 297/229 |
| 6,971,198 B2 | 12/2005 | Venegas, Jr. | ............. | 40/607.01 |
| 6,971,716 B2 | 12/2005 | DePaulis et al. | ............ | 297/229 |
| 7,000,984 B1 * | 2/2006 | Ward | ..................... | 297/228.12 |
| 7,240,964 B2 * | 7/2007 | Riley | .......................... | 297/229 |
| 2003/0164630 A1 * | 9/2003 | McKinney et al. | ......... | 297/220 |
| 2007/0257533 A1 * | 11/2007 | Resendez | ............... | 297/228.11 |

* cited by examiner

*Primary Examiner*—David Dunn
*Assistant Examiner*—Erika Garrett
(74) *Attorney, Agent, or Firm*—Law Offices of J. D. Geraigery; Janine Geraigery

(57) ABSTRACT

A Federal Aviation Administration approved removable, reusable seat headrest apparatus for use as a display device on the seat headrest of a plane. The headrest apparatus includes a frame assembly and an advertising display. The frame assembly includes a first material portion, a second material portion and a median portion connected therebetween. The second material portion has a viewing window for accepting a viewing pocket or an interchangeable display. The interchangeable display includes a frame, molding and transparent insert. The viewing window receives and displays interchangeable advertising material therein, while allowing travelers to selectively review and retain the materials.

15 Claims, 2 Drawing Sheets

SEAT HEADREST COVER FOR USE AS A DISPLAY DEVICE

CROSS-REFERENCE TO RELATED APPLICATIONS

This application is a continuation-in-part application, claiming priority of patent application Ser. No. 11/052,638 filed on Feb. 7, 2005 now abandoned and continuation in part application Ser. No. 11/999,767 filed on Dec. 7, 2007, both with the United States Patent and Trademark Office.

BACKGROUND OF THE INVENTION

1. Field of Invention

The present invention relates generally to a display device, and more particularly, to a Federal Aviation Administration approved removable, reusable seat headrest cover for use on plane, train, bus and automobile seats containing removable advertising and promotional items.

In the competitive marketplace, businesses are seeking more ways to advertise to consumers and get their message into the awareness of potential customers. In particular, the consumer on business travel or vacation travel is a desirable customer because, when away from home, travelers need to purchase more. Consumers are in a mood to spend while on their vacations, whereas business travelers often utilize an expense account. Furthermore, travelers are not always aware of what types of business options are available to them while away from home. Traditional methods of advertising such as billboards are location specific, but are difficult to repaint or resurface to reflect current information, and of course they are suited for placement outdoors. Magazine and other print advertisements are updated frequently, and can be located near a consumer, but they lack the visibility of a posted advertisement. There is a need for a customizable advertisement device that can be tailored to the traveler based on the particular destination of a traveler, as well as their chosen mode of transportation. There is also a need to provide an advertisement and promotional device that is easily updated or changed and can take advantage of the significant time a traveler spends traveling in anticipation of their intended destination.

At the same time, while there is a need the product fulfils, the product would ultimately be more detrimental than helpful if it in any way impeded the safety of the various forms of travel in which it can be used. In particular, many people are concerned with airplane safety and the risk would not be worth the benefit should the product be a potential in-flight hazard. As a result, compliance with FAA regulations is a priority. The U.S. Department of Transportation Federal Aviation Administration has ultimately issued a statement of compliance with the federal aviation regulations approving the structural aspects of the engineering data for the head rest cover and placard installation assembly.

2. Description of the Related Art

United States Patent Application Publication US 2003/0164630 A1 discloses an automobile headrest cover that provides for a matching fabric and a logo on the forward facing side of the headrest cover.

U.S. Pat. No. 4,056,281 discloses a disposable back seat headrest cover that provides a hygienic, replaceable cover for an occupant.

U.S. Pat. No. 4,099,772 discloses a replaceable headrest cover including a mechanism for securing the headrest cover to the headrest.

U.S. Pat. No. 4,627,587 discloses an airplane seat cover with a detachable cushion that also serves as a flotation device.

U.S. Pat. No. 6,971,716 discloses a system for temporarily protecting vehicle seat covers and floor mats during transportation from the manufacturer to the automobile assembly plant.

U.S. Pat. No. 4,206,945 discloses a back and head cloth or sheet for use as a cover for the seat backs of mass transportation vehicles.

U.S. Pat. No. 6,761,404 discloses a temporary plastic protective seat cover, system and method for use on automobile seats.

U.S. Pat. No. 6,971,198 discloses a post cover with advertising for use on substantially semi-circular guard posts or protective stanchions.

None of the foregoing patents discloses a removable, reusable seat headrest cover for use as a display device on plane, train, bus and automobile seats containing removable advertising and promotional items.

While these units may be suitable for the particular purpose employed, or for general use, they would not be as suitable for the purposes of the present invention as disclosed hereafter.

SUMMARY OF THE INVENTION

The invention is defined by the appended claims with a plurality of specific embodiments shown in the attached drawings. For the purpose of summarizing the invention, the invention comprises a removable, reusable seat headrest apparatus for use on plane, train, bus and automobile seats containing removable advertising and promotional displays. The apparatus includes a frame assembly and advertising display made of a durable, printable, fire resistant material. The advertising display has at least one re-sealable opening to at least one transparent viewing window for receiving and displaying replaceable advertisements therein. The viewing window also allows travelers to detach or remove the advertisements and promotional items therefrom.

It is an object of the invention to comply with the Federal Aviation Administration regulations to ensure safety for travelers while the apparatus is in use in an aircraft.

It is a further object of the present invention to provide a seat headrest apparatus for use as a display device for advertisements and removable promotional materials, such as coupons and flyers.

It is yet a further object of the invention to provide a seat headrest apparatus with at least one viewing window that is easily attached to a seat headrest, and is easily fitted with new, replaceable advertising or promotional pieces.

It is a further object of the invention to provide a seat headrest apparatus for use as an advertising display that does not interfere with the operability of aircraft tray tables or the safety of the transportation method.

It is another object of the invention to provide at least two elastic members for securely fastening the apparatus to the seat headrest.

It is another object of the invention to provide an advertising display having a translucent or transparent sheet or insert for allowing the contents of the window viewable.

It is a further object of the invention to provide a means for removing advertising material contained with the advertising display. This allows for a dispensable information piece that travelers can slide out and take with them, including but not limited to, advertisements, coupons, maps, or other like information.

It is another object of the invention to provide a reversible advertising display such that the insert or pocket opening of the present invention is sealed, trapping the accessible pocket against the seat and preventing the removal of the advertisement.

It is a further object of the invention to provide an advertising display and insert that can be sized to receive an electronic image producing device that presents informative or entertaining images.

A Federal Aviation Administration approved removable, reusable seat headrest apparatus for use as a display device on the seat headrest of a plane. The headrest apparatus includes a frame assembly and an advertising display. The frame assembly includes a first material portion, a second material portion and a median portion connected therebetween. The second material portion has a viewing window for accepting a viewing pocket or an interchangeable display. The interchangeable display includes a frame, molding and transparent insert. The viewing window receives and displays interchangeable advertising material therein, while allowing travelers to selectively review and retain the materials.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

Because travelers spend most of a trip in a seated position, it is desirable to provide an advertising system that places an advertisement in plain view of the traveler for the duration of the trip. It is also desirable to have a destination appropriate advertisement, especially for vacation destinations. Whereas national brands account for most advertising, it is the unique location-specific aspects of a destination that are both desired by travelers and most effectively advertised to travelers.

Figure 2:
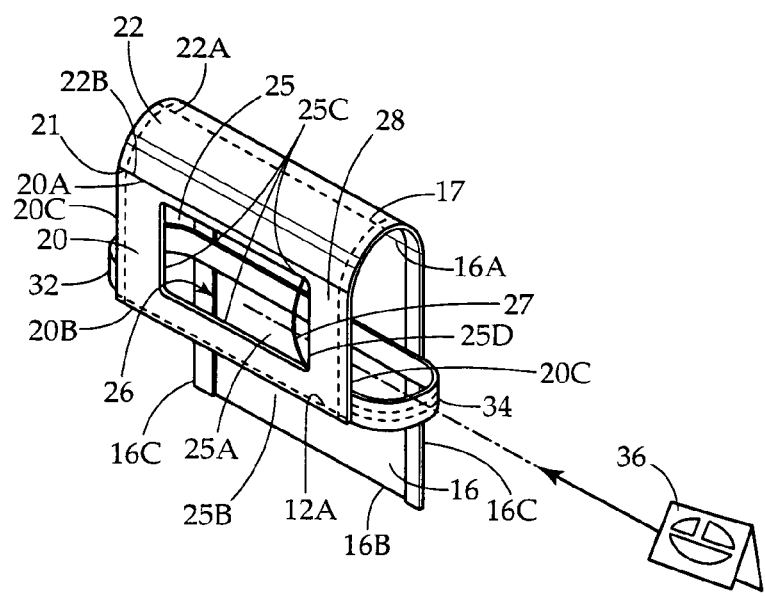

FIG. 2 illustrates a diagrammatic perspective view of a frame assembly of the preferred embodiment of the seat headrest cover of the present invention, having a first and second material portion, connected together by a median, and wherein the second material portion has an advertising display.

Figure 3:
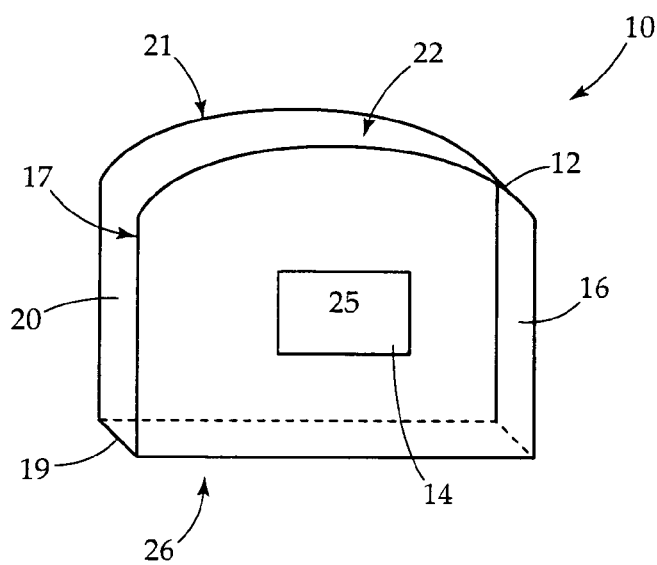

FIG. 3 illustrates a diagrammatic perspective view of an alternate embodiment of the frame assembly of the present invention.

Figure 4:
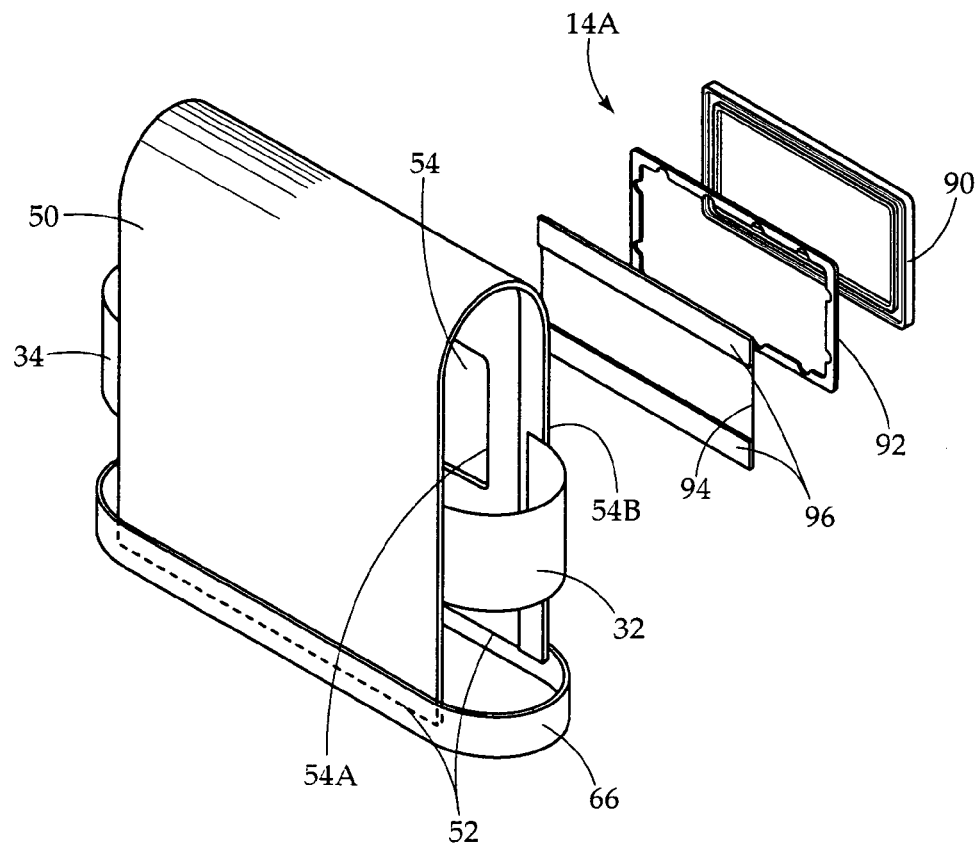

FIG. 4 illustrates an exploded view of the advertising display of the preferred embodiment of the present invention.

DETAILED DESCRIPTION OF THE PREFERRED EMBODIMENTS

Figure 1:
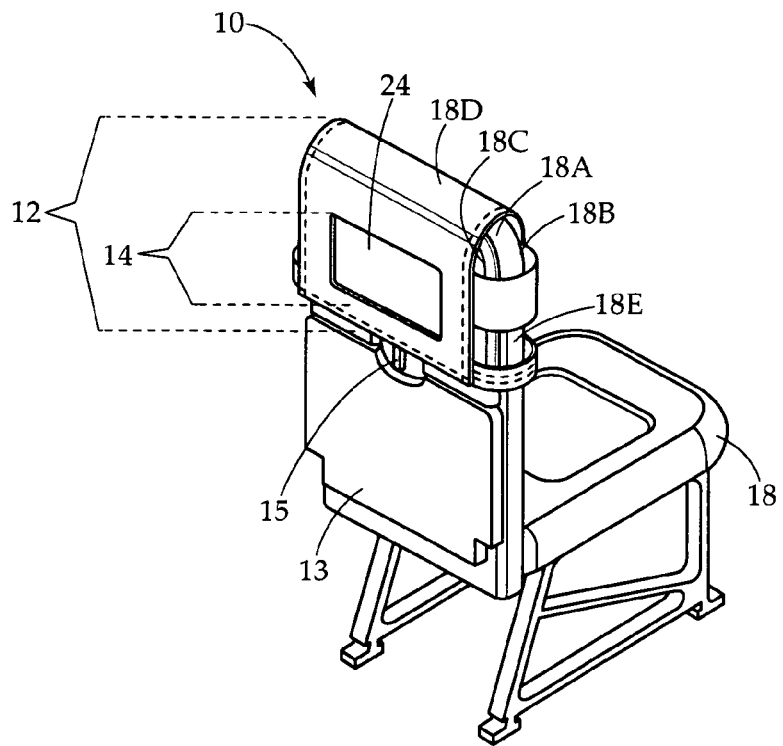
FIG. 1 illustrates a diagrammatic perspective view of the preferred embodiment of a deployed Federal Aviation Administration approved seat headrest cover of the present invention for use as a display device on an airplane seat.

FIG. 1 illustrates the preferred embodiment of an Federal Aviation Administration (FAA) approved headrest apparatus 10 deployed for use on an airplane seat 18. In its broadest context, the headrest apparatus 10 is comprised of a frame assembly 12 and an advertising display 14.

The airplane seat 18 includes a seat headrest 18A having a front seat surface 18B, a rear seat surface 18C, connected along a top by a top surface 18D and along sides by two sides 18E. The seat headrest 18A allows for the headrest apparatus 10 to be fitted other over and utilized by advertisers to promote wares. In addition, the headrest apparatus 10 is designed so as to not interfere with proper use of an aircraft tray table 13 installed on the rear seat surface 18C of the seat 18. The tray table 13 further includes a tray table latch housing 15 which actuates the fastening of the tray table 13 in the upright and locked position.

FIG. 2 illustrates the frame assembly 12 of the FAA approved headrest apparatus 10. The frame assembly 12 is available as either a rigid or flexible member. Here, the headrest apparatus 10 includes three material portions, a first material portion 16, a second material portion 20 and a median portion 22 sandwich therebetween, which assemble together to define the frame assembly 12. The first material portion 16 has an attaching edge 16A opposite a distal edge 16B, and parallel side edges 16C. The first material portion 16 is contoured in shape to conform against the front seat surface 18B of the seat headrest 18A. The second material portion 20 has an attaching edge 20A opposite a distal edge 20B and two parallel side edges 20C. The second material portion 20 is contoured in shape to conform against the rear seat surface 18C of the seat headrest 18A, while careful not to interfere with a tray table 13 attached along the rear seat surface 18C and below the second material portion 20. Preferably, at least 0.05 inches in distance is between the seat tray table latch housing 15 and the second material portion 20. A median portion 22 has a first edge 22A and a second edge 22B and contours in shape to conform against the top surface 18D of the seat headrest 18A.

The first edge 22A of the median portion 22 engages the first material portion 16 along the attaching edge 16A, while the second edge 22B of the median portion 22 engages the second material portion 20 along the attaching edge 20A. A seam 17 is defined by the connection of the first edge 22A of the median portion 22 and the attaching edge 16A of the first material portion 16, while a seam 21 is defined by the connection of the second edge 22B of the median portion with the attaching edge 20A of the second material portion 20. An opening 26 is defined by assembling together the first material portion 16, the median portion 22, and the second material portion 20, such that the opening accepts the seat headrest 18A.

The frame assembly 12 is fitted with a securing means for allowing the headrest apparatus 10 to easily fit over and secure to the airplane seat 18. In the preferred embodiment, the securing means is a pair of elastic members, including a first elastic member 32 and a second elastic member 34. The first and second elastic members 32 and 34 are integrally attached to the side edges 16C of first material portion 16 and the side edges 20C of the second material portion 20C. The first elastic member 32 and the second elastic member 34 are along one common similar horizontal plane, and both extend horizontally from side edges 16C to side edges 20C. When the frame assembly 12 is positionable on the seat headrest 18A, the elastic member 32 and 34 stretch and secure around the sides 18E of the seat headrest 18A. This preferred embodiment of the frame assembly 12 of the headrest apparatus 10 is easily fitted over the seat headrest 18A and as shown secured in place on the airplane seat 18 by the elastic members 32 and 34. Other mechanical closure means known in the art can also be utilized to secure the material portion to the seat headrest, including but not limited to, snap closures and hook and loop fasteners.

The material portions of the frame assembly 12 are preferably stitched 12A along the edges. Stitching may be of the pattern, fold over, fold under, double fold over, double fold under, and surge. In addition, hook and loop is also contemplated and may be either hook or pile. All materials used comply with flammability requirements.

A centrally located and prominently positioned advertising display 14, including a transparent viewing window 24, is contained within the second material portion 20. The headrest apparatus 10 provides a means for distributing a dispensable advertising piece 36 through the advertising display 14.

A plurality of different advertising displays 14 are contemplated for holding printed advertising materials 36. FIG. 2 illustrates one embodiment of the advertising display 14, wherein said material 36 is inserted into a transparent viewing pocket 25 integrally connected to the second material portion 20. Specifically, the second material portion 20 includes an outside surface 28, wherein the substantially rectangular viewing pocket 25 is positioned centrally thereon. The viewing pocket 25 is comprised of a pair of substantially rectangular transparent sheets connected together on three sides. Particularly, an outward transparent sheet 25A and an inward transparent sheet 25B are connected along the three sides 25C. A pocket opening 27 extends vertically along a fourth side 25D and allows a user to insert promotional and advertising material into the viewing pocketing 25 by inserting printed material between the inward and outward transparent sheets 25A and 25B. The printed material is held securing in place within the viewing pocket 25 by means of the three sides 26C which are fixed together.

FIG. 3 illustrates an alternate embodiment of the frame assembly 12 of the headrest apparatus 10. In this embodiment, the median portion 22 extends across the top surface 18D of the seat headrest 18A and downwardly along the sides 18E of the seat headrest 18A, and forms a uniform bottom edge 19 with the first and second material portions 16 and 20. Here, the medial portion 22 is connected to the first and second material portions 16 and 20 along seams 17 and 21, however, said seams 17 and 21 extend downwardly at a ninety degree angle from the top surface 18D of the seat headrest 18A along the sides 18E of the seat headrest 18A. In this embodiment, the bottom edge 19 slides over the seat headrest 18A accepting the seat headrest 18A between the first material portion 16, the median portion 22, and the second material portion 20, such that the opening accepts the seat headrest 18A.

FIG. 4 illustrates an exploded view of the advertising display 14 and frame assembly 12 of the preferred embodiment of the headrest apparatus 10 of the present invention for providing a means for distributing a dispensable advertising piece 36 through the advertising display 14.

In this embodiment, the first and second material portions 16 and 20 along with the median portion 22 are integrally coupled so as to form one continuous substantially elongated and rectangular portion 50. The rectangular portion 50 includes distal edges 52, and centrally folds over the top surface 18D of the seat headrest 18A such that each distal edge 52 hangs equidistant from the top surface 18D of the seat headrest 18A. In addition, the sides 18E of the seat headrest 18A are substantially covered by the first and second elastic members 32 and 34 which are substantially larger in order to securely rest in position against the sides 18E of the seat headrest 18A. A substantially elongated circular frame 66 extends circumferentially around the distal edges 52 of the rectangular portion 50 for attaching to said distal edges 52 and further helping to control and secure the apparatus 10 to the seat headrest 18A. The circular frame 66 may be either flexible or rigid for accepting the distal edges 52 therein.

The outside surface 28 of the second material portion 20 includes the substantially rectangular viewing window 24, which in this embodiment is a substantially rectangular cutout cavity 54 having an inside 54A and an outside 54B. In use the viewing window 24 is positioned just above the tray table against the rear seat surface 18C of the seat headrest 18A. The advertising display 14 includes and interchangeable display 14A including a frame 90, a molding 92 and an insert 94. The frame 90 is preferably a metal or plastic frame 90. The insert 94 is transparent and includes a top and bottom track 96, such that a printed advertising display is insertable within the tracks 96 of the insert 94 and visible therethrough. Specifically, the insert 94 is positionable against the molding 92 which is against the inside 54A of the cavity 54. The frame 90 is positionable against the outside 54B of the cavity 54. The molding 92 is positionable between the insert 94 and the inside 54A of the cavity 54. The advertising display 14 is secured to the cavity 54 by crimping the viewing window 24 between the molding 92 and the frame 90. Preferably, the frame 90 and insert 94 are further secured to the outside 54B and inside 54A of the cavity 54 respectively, by adhesive acrylic. The user may easily insert and remove promotional printed advertising materials 36, while perfectly viewing the advertisements.

In addition embodiments, the advertising display 14 and insert 94 can be sized to receive an electronic image producing device that presents informative or entertaining images.

The headrest apparatus 10 is easily assembled by inserting printed advertising material into the tracks 96 of the insert 94 of the interchangeable display 14A. Next, the user secures the interchangeable display 14A into the cutout cavity 54 of the viewing window 24 by crimping the viewing window 24 between the molding 92 and the frame 90 and by applying adhesive acrylic to the outside and inside 54B and 54A of the cavity 54 before affixing the frame 90 and insert 94 thereto respectively. After which, the user secures the frame assembly 12 vertically on the seat headrest 18A by securely pulling the circular frame 66 downwardly onto the seat headrest 18A by inserting the seat headrest 18A into the opening 26 of the frame assembly 12. Then, the user secures the frame assembly 12 horizontally to the seat headrest 18B by stretching the elastic members 32 and 34 around the sides 18E of the seat headrest 18B.

In conclusion, herein is presented headrest apparatus. The invention is illustrated by example in the drawing figures, and throughout the written description. It should be understood that numerous variations are possible, while adhering to the inventive concept. Such variations are contemplated as being a part of the present invention.

What is claimed is:

1. A removable, reusable headrest apparatus for use on a seat headrest, said seat headrest having a front seat surface, a rear seat surface, a top surface and two sides, and a tray table installed on said rear seat surface and including a tray table latch housing, the headrest apparatus comprising:

a frame assembly including three material portions, a first material portion, a second material portion and a median portion sandwich therebetween, wherein said first material portion is substantially contoured in shape to conform against said front seat surface of said seat headrest and has an attaching edge opposite a distal edge and parallel side edges, wherein said second material portion is substantially contoured to conform against said rear seat surface of said seat headrest and has an attaching edge opposite a distal edge and two parallel side edges, and wherein said median portion is substantially contoured to conform against said top surface of said seat headrest and has a first edge and a second edge, wherein said first edge of said median portion engages said attaching edge of said first material portion, while said second edge of said median portion engages said attaching edge of said second material portion;
a first seam defined by said first edge of said median portion and said attaching edge of said first material portion;
a second seam defined by said second edge of said median portion and said attaching edge of said second material portion;
an opening defined by assembling together said first material portion, said median portion, and said second material portion;
a securing means including a pair of elastic members, including a first elastic member and a second elastic member, wherein said first and second elastic members integrally attach to said side edges of said first material portion and said side edges of said second material portion, wherein the first and second elastic members are along one horizontal plane, and extend horizontally from said side edges of said first material portion to side edges of said second material portion;
one continuous substantially elongated and rectangular portion integrally formed by said first and second material portions and said median portion integrally coupling together, said continuous portion having two distal edges and centrally folding over said top surface of said seat headrest such that each distal edge falls equidistant from said top surface of said seat headrest, wherein said sides of said seat headrest are substantially covered by said first and second elastic members;
a substantially elongated circular frame extending circumferentially around and integrally coupled to said distal edges of said rectangular portion;
a transparent viewing window centrally located within said second material portion, wherein said viewing window of said second material portion further includes a substantially rectangular cutout cavity having an inside and an outside; and
an advertising display including an interchangeable display having a frame, a molding and a transparent insert, said insert having a top and bottom track and being positionable against said molding which is positionable against said inside of said cavity such that said molding is between said insert and said inside of said cavity, wherein said frame is positionable against said outside of said cavity.

2. The apparatus of claim 1, wherein the advertising display is secured to the cavity by crimping the viewing window between the molding and the frame.

3. The apparatus of claim 1, wherein the frame and insert are secured to the outside and inside of the cavity respectively, by adhesive acrylic.

4. The apparatus of claim 1, wherein advertising materials are insertable within said tracks of said insert and removable and replaceable therefrom.

5. The apparatus of claim 1, further comprising one uniform bottom edge with said first and second material portions and said median portion, whereby said median portion extends across said top surface of said seat headrest and downwardly along said sides of said seat and connects to said first and second material portions along said first and second seems respectively, and wherein said seems extend downwardly at a ninety degree angle from said top surface of said seat headrest along said sides of said seat headrest.

6. The apparatus of claim 1, wherein said second material portion is positionable above said tray table against said rear seat surface of said seat headrest a predetermined distance about a tray table latch housing.

7. The apparatus of claim 1, wherein the frame assembly 12 is positionable on the seat headrest such that said elastic members stretch to secure around said sides of said seat headrest.

8. The apparatus of claim 1, wherein advertising materials are insertable within the pocket opening of the viewing window between the inward and outward transparent sheets.

9. The apparatus of claim 1, further comprising one uniform bottom edge with said first and second material portions and said median portion, whereby said median portion extends across said top surface of said seat headrest and downwardly along said sides of said seat and connects to said first and second material portions along said first and second seems respectively, and wherein said seems extend downwardly at a ninety degree angle from said top surface of said seat headrest along said sides of said seat headrest.

10. The apparatus of claim 1, wherein said second material portion is positionable above said tray table against said rear seat surface of said seat headrest a predetermined distance about a tray table latch housing.

11. The apparatus of claim 1, wherein the frame assembly 12 is positionable on the seat headrest such that said elastic members stretch to secure around said sides of said seat headrest.

12. A removable, reusable headrest apparatus for use on a seat headrest, said seat headrest having a front seat surface, a rear seat surface, a top surface and two sides, and a tray table installed on said rear seat surface and including a tray table latch housing, the headrest apparatus comprising:
a frame assembly including three material portions, a first material portion, a second material portion and a median portion sandwich therebetween, wherein said first material portion is substantially contoured in shape to conform against said front seat surface of said seat headrest and has an attaching edge opposite a distal edge and parallel side edges, wherein said second material portion is substantially contoured to conform against said rear seat surface of said seat headrest and has an attaching edge opposite a distal edge and two parallel side edges, and wherein said median portion is substantially contoured to conform against said top surface of said seat headrest and has a first edge and a second edge, wherein said first edge of said median portion engages said attaching edge of said first material portion, while said second edge of said median portion engages said attaching edge of said second material portion;
a first seam defined by said first edge of said median portion and said attaching edge of said first material portion;
a second seam defined by said second edge of said median portion and said attaching edge of said second material portion;
an opening defined by assembling together said first material portion, said median portion, and said second material portion;
a securing means including a pair of elastic members, including a first elastic member and a second elastic member, wherein said first and second elastic members integrally attach to said side edges of said first material portion and said side edges of said second material portion, wherein the first and second elastic members are along one horizontal plane, and extend horizontally from said side edges of said first material portion to side edges of said second material portion;
a transparent viewing window centrally located within said second material portion;
an advertising display including a transparent viewing pocket integrally connected to said viewing pocket of said second material portion for accepting advertising material, wherein said viewing pocket of said second material portion includes an outside surface wherein said viewing pocket is integrally coupled thereto, said viewing pocket includes a pair of substantially rectangular transparent sheets including an outward transparent sheet and an inward transparent sheet, each said sheet having four sides and being permanently fixed together on said three sides; and a pocket opening extends vertically along said fourth side.

13. The apparatus of claim 12, further comprising one continuous substantially elongated and rectangular portion integrally formed by said first and second material portions and said median portion integrally coupling together, said continuous portion having two distal edges and centrally folding over said top surface of said seat headrest such that each distal edge falls equidistant from said top surface of said seat headrest, wherein said sides of said seat headrest are substantially covered by said first and second elastic members.

14. The apparatus of claim 12, further comprising a substantially elongated circular frame extending circumferentially around and integrally coupled to said distal edges of said rectangular portion.

15. A method of assembling a headrest apparatus, the steps comprising:

i. providing the apparatus of claim 1;

ii. inserting printed advertising material into the tracks of the insert of the interchangeable display;

iii. securing the interchangeable display into the cutout cavity of the viewing window by crimping the viewing window between the molding and the frame and by applying adhesive acrylic to the outside and inside of the cavity before affixing the frame and insert thereto respectively;

iv. securing vertically the frame assembly on the seat headrest by securely pulling the circular frame downwardly onto the seat headrest by inserting the seat headrest into the opening of the frame assembly; and v. securing horizontally the frame assembly to the seat headrest by stretching the elastic members around the sides of the seat headrest.

\* \* \* \* \*